United States Patent

[11] 3,617,902

[72] Inventor Douglas M. Bauer
Danvers, Mass.
[21] Appl. No. 60,819
[22] Filed Aug. 4, 1970
[45] Patented Nov. 2, 1971
[73] Assignee General Electric Company

[54] FREQUENCY MULTIPLIER
6 Claims, 4 Drawing Figs.

[52] U.S. Cl. .......... 328/38, 328/41, 328/127, 307/215
[51] Int. Cl. .......... H03k 5/00
[50] Field of Search .......... 328/38, 127, 41, 48; 307/215

[56] References Cited
UNITED STATES PATENTS

| | | | |
|---|---|---|---|
| 2,970,269 | 1/1961 | Williams .......... | 328/38 |
| 3,044,065 | 7/1962 | Barney et al. .......... | 328/48 X |
| 3,414,735 | 12/1968 | Harris et al. .......... | 328/127 X |
| 3,448,387 | 6/1969 | Brandt et al. .......... | 328/38 X |

*Primary Examiner*—John S. Heyman
*Attorneys*—I. David Blumenfeld, Robert P. Cogan, Frank L. Neuhauser, Oscar B. Waddell and Joseph B. Forman ABSTRACT: A frequency multiplier which comprises a voltage-controlled oscillator the output of which is controlled by differential integrator. First and second bistable logic circuits are connected to the inputs of the integrator. The first bistable logic circuit changes its state in response to an input pulse to produce a control voltage for the oscillator from the integrator. A feedback loop from the oscillator to the second bistable circuit includes a counter coupled to the second bistable logic circuit to change the state of the second bistable logic and resets the first circuit after a predetermined number of output pulses. This sequence controls the input level to the voltage-controlled oscillator, and hence the multiplication factor of the circuit.

| J | K | Q BEFORE CLOCK PULSE | Q AFTER CLOCK PULSE |
|---|---|---|---|
| 1 | 1 | 0 | 1 |
| 1 | 1 | 1 | 0 |

INVENTOR
DOUGLAS M. BAUER

BY Joseph B. Forman
ATTORNEY

INVENTOR
DOUGLAS M. BAUER

BY

ATTORNEY

FREQUENCY MULTIPLIER

BACKGROUND OF THE INVENTION

This invention relates to a frequency-multiplying circuitry. More specifically, it relates to pulse generators which produce a predetermined number of output pulses for each input pulse.

Pulse frequency multipliers of the type which include a pulse generator which produces a predetermined number of output pulses for one input pulse are well known. In order to provide accurate control of the input to output pulse ratio, feedback loops are commonly utilized to maintain the proper ratio. For example, one prior art frequency multiplier employs a frequency comparator in the feedback loop. The characteristics of the components utilized in the frequency comparator are often such that the reference frequency to which the output frequency is compared can drift, causing errors in the output of the frequency multiplier. Another known form of frequency multiplier utilizes a phase-sensitive detector which compares the phase of the output pulses to the phase of a source of reference pulses. Such a circuit is also quite susceptible to errors because the phase-sensitive detector is responsive to harmonics or subharmonics of the output frequency as well as to the output frequency itself.

SUMMARY OF THE INVENTION

It is therefore, an object of the present invention to provide a frequency multiplier having error-free operation over a wide range of input frequencies.

It is further an object of the present invention to provide a pulse frequency multiplier incorporating digital logic elements to form an error-free phase and frequency comparator.

Yet another object of the present invention is to provide a pulse frequency multiplier in which the output pulse rate is accurately controlled by means of a feedback loop.

Other objects and advantages of the invention will become apparent as the description thereof proceeds.

Briefly stated, in accordance with the present invention, there is provided a frequency multiplier capable of error-free operation over a wide range of input frequencies. First and second bistable logic circuits are connected to the inputs of a differential integrating circuit which supplies a voltage to a voltage-controlled oscillator. Input pulses which are to be multiplied by a factor *m* are applied to the first bistable logic circuit. In the absence of an input pulse, the differential integrator provides a first voltage level to the voltage-controlled oscillator. The appearance of an input pulse causes the first bistable logic circuit to change state so that the output from the differential integrator increases. This, in turn, causes the frequency of the voltage-controlled oscillator to increase. The output pulses from the oscillator coupled to a feedback loop which includes a divider-counter. The counter provides an output pulse to the second bistable circuit after it reaches a predetermined count. This output pulse changes the state of the second bistable logic circuit and resets both the first and second bistable logic circuits. Consequently, the inputs to the differential integrator return to their first level. The output of the voltage-controlled oscillator decreases until the occurrence of the next input pulse, when the above-described operation is repeated. After a few input cycles, the system stabilizes and, for a given input frequency, a phase difference between the inputs of the first and second bistable logic circuits is established, and a substantially constant output frequency is provided.

BRIEF DESCRIPTION OF THE DRAWINGS

The circuitry through which the foregoing objects are achieved and the features of novelty characterizing the present invention are pointed out with particularity in the claims forming the concluding portion of the specification. For a better understanding of the present invention, both as to its organization and manner of operation, as well as further objects attained through its use, reference should be made to the following description taken in connection with the following drawings in which:

FIG. (1 and 1*a*) is a schematic representation of a frequency multiplier constructed in accordance with the present invention.

DESCRIPTIONS OF THE PREFERRED EMBODIMENTS

Figures 1, 1A:
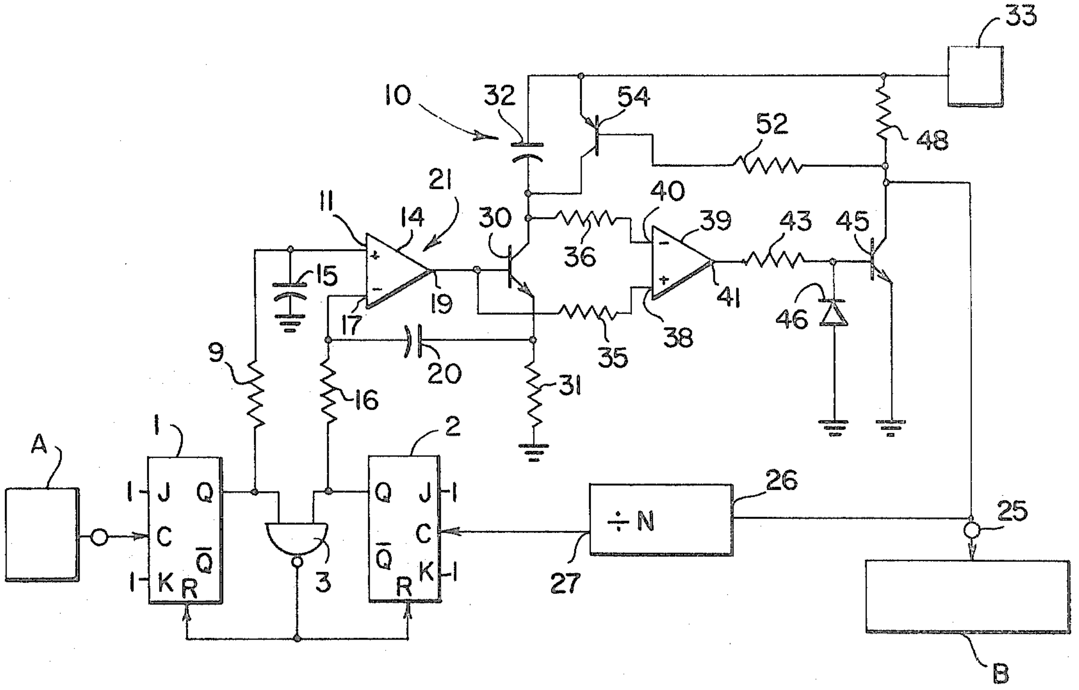

FIG. 1 illustrates a frequency multiplier constructed in accordance with the present invention which is connected between a source A of input pulses and a load B. The frequency multiplier includes first and second switching means 1 and 2 which are bistable logic circuits, connected to form a phase and frequency comparator which provides an input to a voltage-controlled oscillator 10 to provide an output frequency at a desired multiple m of the input frequency.

In the present embodiment, both the first and second switching means 1 and 2 comprise J–k flip-flops. The J–k flip-flop is a well-known switching means and operates in accordance with the truth table illustrated in FIG. 1*a*. In the present embodiment potentials having a logic level of "one" are connected to the J and K input terminals of flip-flops 1 and 2. The Q terminals of flip-flops 1 and 2 are connected to the first and second input terminals of a NAND-gate 3 having its output terminal connected to the reset terminals of flip-flops 1 and 2. The input pulses from source A is connected to the clock terminal of flip-flop 1.

The Q output of the flip-flop is coupled to a differential-integrating circuit which controls oscillator 10. A resistor 9 is coupled between the Q terminal of flip-flop 1 and noninverting input terminal 11 of an operational amplifier 14. A capacitor 15 is connected between terminal 11 and a level of reference potential, e.g., ground potential. The Q terminal of the flip-flop 2 is connected by a resistor 16 to inverting input terminal 17 of operational amplifier 14. A feedback capacitor 20 is connected between the output of operational amplifier 14 and inverting input 17 in a feedback loop. Operational amplifier 14 and capacitors 15 and 20 comprise a differential integrator 21. The differential integrator 21 is a voltage source for the voltage-controlled oscillator 10, presently to be described, and which is of the type described and claimed in Ser. No. 852,042, filed Aug. 21, 1969 by Douglas M. Bauer and assigned to the General Electric Company, which is also assignee of the present application.

The pulses at output terminal 25 of voltage-controlled oscillator 10 are applied to a suitable load or utilization circuit B. The output terminal 25 is also coupled to the input terminal of a "divide-by-N" counter having its output terminal 27 connected to the clock input of flip-flop 2. The "divide-by-N" counter 26 is preset prior to commencement of operation to provide one output pulse for a predetermined number N of input pulses. This presetting determines the multiple of the input frequency which comprises the output frequency.

Voltage-controlled oscillators are well-known devices and many varieties are useable in the arrangement of the invention. However, a description of the voltage-controlled oscillator 10 shown in FIG. 1 as well as its mode of operation will be helpful before describing the overall operation of the multiplier.

Voltage-controlled oscillator 10 includes an NPN-transistor having its base connected to integrator terminal 19, its emitter connected through resistor 31, to ground, and its collector connected through capacitor 32 to a source of supply voltage 33. The emitter-base junction of transistor 30 completes the feedback loop for integrating capacitor 20 of operational amplifier 14.

Output terminal 19 of operational amplifier 14 is also coupled via a resistor 35 to noninverting terminal 38 of an operational amplifier 39. An inverting input terminal 40 of the operational amplifier 39 is coupled via a resistor 36 to capacitor 32 and the collector of transistor 30. The potential at the inverting input terminal 40 is responsive to the voltage across capacitor 32. When the voltage across capacitor 32, which is controlled by the output of the operational amplifier 14, reaches a predetermined level, the output of operational amplifier 39 changes from a low state to a high state. Output terminal 41 of the operational amplifier is coupled by a resistor 43 to the base of NPN-output transistor 45. Transistor 45 has its emitter directly connected to ground and its collector coupled to supply voltage source 33 by resistor 48. The collector of the transistor 45 is also connected to the output terminal 25 for coupling the oscillator output pulses to the load.

A diode 46 is connected between the base of the transistor 45 and ground to clamp the base potential of transistor 45 when the output of the operational amplifier 39 is in its low state.

When the output of the operational amplifier 39 goes to its high state, NPN-transistor 45 conducts, and the potential at its collector and at output terminal 25 drops essentially to ground. This negative-going transition at the collector is coupled by resistor 52 to the base of a PNP-switching transistor 54 having its emitter-collector path connected across capacitor 32. The negative-going transition at the collector of the transistor 45 drives PNP-transistor 54 into conduction to provide a discharge path for capacitor 32. As capacitor 32 discharges the voltage drops until the input voltage level at input terminal 40 of operational amplifier 39 reaches a level which causes the voltage at output terminal 41 to return to its low state. Transistor 45 is cut off terminating the output pulse.

OPERATION OF THE CIRCUIT

Figure 2:
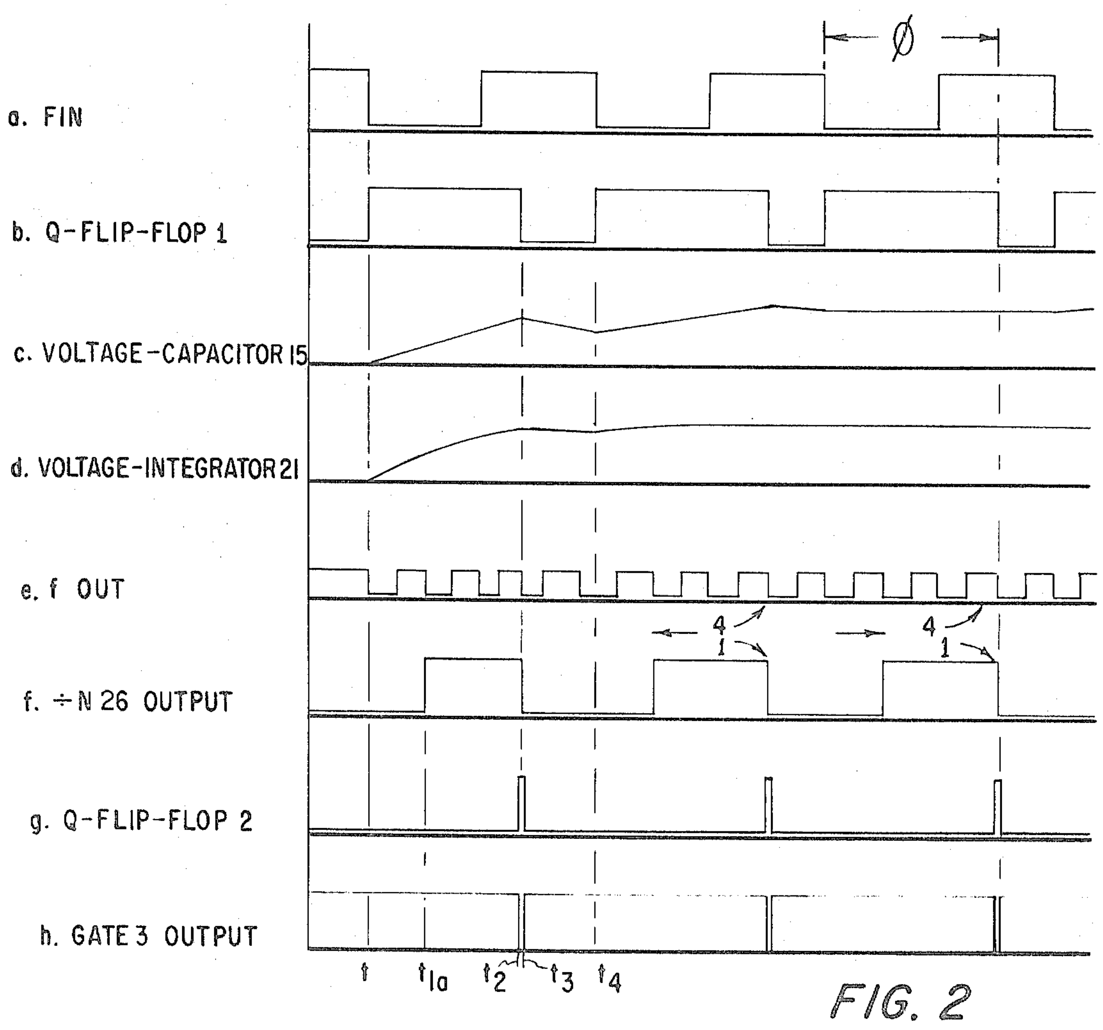
FIG. 2 is a waveform chart useful in illustrating the operation of the circuit of FIG. 1

Operation of the multiplier may be more easily understood by referring to the waveform diagram of FIG. 2. FIG. 2*a* shows the input from source A with the negative-going transition being the leading edge of each input pulse. FIG. 2*b* shows the voltage levels at the Q terminal of flip-flop l.

FIG. 2*c* shows the voltage variations across capacitor 15, while FIG. 2*d* represents the voltage at the output of the differential integrator 21. The multiplied pulse train $f_{out}$, is illustrated in FIG. 2*e*, with the negative-going transitions marking the leading edge of each pulse. FIG. 2*f* shows the output of the counter 26 and FIGS. 2*g* and 2*f* show the state of the Q terminal of the flip-flop 2, and the output of NAND-gate 3, respectively.

Referring now to FIG. 2*a* the leading edge of the input pulse is shown by a negative-going transition occurring at time $t_1$. This pulse is supplied to the clock input of flip-flop 1 and causes the Q terminal level to go from a "zero" level to a voltage designated as a logic level of "one" FIG. 2*b*). The Q output terminal of flip-flop 2, on the other hand, remains at a "-zero" level. Capacitor 15 begins to charge toward the level at the Q terminal and the voltage across the capacitor increases (FIG. 2*c*) at a rate determined by the time constant of resistor 9 and capacitor 15. Consequently, the output of differential integrator 21 applies an increasing positive output to the base of the transistor 30 (FIG. 2*d*). Thus, at time $t_1$, operation of voltage-controlled oscillator 10 is initiated to provide output pulses (FIG. 2*e*).

The output pulse rate from VCO 10, it will be obvious, increases as the input to terminal 11 of the operational amplifier 14 increases and decreases if the input to terminal 11 decreases, since the voltage level from operational amplifier 14 determines how rapidly capacitor 32 charges up to the predetermined level of voltage at which operational amplifier 39 switches states to generate the output pulses. The "divide-by-N" counter 26 begins counting output pulses. For simplicity of illustration, it is assumed that it is desired to produce four output pulses for each input pulse and that the counter 26 is preset accordingly. Thus, after 2 output pulses, at time $t_A$, the output of "divide-by-N" counter 26 goes from a "zero" state to a "one" state. At time $t_2$after 2 more output pulses from VCO 10, the output of counter 26 returns to a "zero" state, as shown by negative-going transition of FIG. 2*f*. Thus, at time $t_2$, an input is provided to the clock terminal of flip-flop 2.

The Q of the terminal of the flip-flop 2 assumes a "one" state in response to this pulse form divider 26 as shown in FIG. 2*g*. Both inputs of NAND-gate 3 are now at the logic "1" level so that the output of NAND-gate 3 goes to the "zero" level (FIG. 2*h*). This pulse is applied to the reset terminals and resets flip-flops 1 and 2 at time $t_3$(FIGS. 2*b* and 2*g*). This resetting takes place in nanoseconds and its duration is exaggerated in FIG. 2 for purposes of illustration.

With flip-flop 1 reset at time $t_3$, and the voltage at its Q terminal at "0" level, capacitor 15 begins discharging. Thus, the input to terminal 11 and the output from operational amplifier 14 begins to decrease, as shown in FIGS. 2*c* and 2*d*. Consequently, the pulse rate decreases and continues to decrease until the initiation of a next input pulse, illustrated as occurring at time $t_4$in FIG. 2*a*. The Q output of flip-flop 1 again assumes a "1" state, and capacitor 15 begins charging from the level to which it has discharged. The output frequency again begins rising until the "divide-by-N" counter 26 counts the predetermined number of pulses (4 pulses in this example) at which time, the flip-flops 1 and 2 are again reset.

After the first cycle of operation, it is possible for the output of voltage-controlled oscillator 10 to exceed the desired multiplication factor sufficiently so that after flip-flop 1 has been reset, counter 26 provides an output to change the state of the flip-flop 2 before the state of flip-flop 1 is changed by a next input pulse. As a result, a "one" level is applied to inverting input terminal 17 of operational amplifier 14 while a "zero" level is applied to noninverting input terminal 11. The output voltage of the differential integrator 21 and output frequency of the voltage-controlled oscillator 10 decrease until the next input pulse changes the state of flip-flop 1. When this occurs, potentials having a "one" level are provided to both inputs of the NAND-gate 3, and both the flip-flops 1 and 2 are reset. Operation continues in the fashion described above, depending on whether a counter output or an input pulse occurs. The frequency multiplier operates in such a manner that when the output frequency of voltage-controlled oscillator 10 is below the desired output frequency, a "1" output is provided from the flip-flop 1 for a greater period of time than a "1" output is provided from the flip-flop 2. Conversely, a "1" output is provided for a greater period of time from the flip-flop 2 when the output of the voltage-controlled oscillator 10 exceeds the desired output frequency.

By a proper choice of the integrator time constant in relation to the frequencies and the multiplication involved, e.g., choice of the values of the resistor 9 and capacitor 15, the system can be made to stabilize rapidly. That is, the system reaches a state in which the voltage from differential integrator 21 is at a level which causes voltage-controlled oscillator 10 to provide the desired output frequency. Depending on the characteristics of the components of the frequency multiplier, the input to flip-flop 1 will lead or lag the input to the flip-flop 2 by a phase angle $\theta$. As the system stablizes, the angle $\theta$ (which measures the time difference between the leading edges of the inputs applied to the flip-flops 1 and 2 respectively) approaches 0. As the system stabilizes the charge on capacitor 15 reaches a constant level. If the potential across the capacitor 15 drops due to leakage, e.g., the input to the flip-flop 1 will lead the input to the flip-flop 2. This results in applying a potential to input terminal 11 for a period of time sufficient to compensate for leakage. Thus, any tendency of operational amplifier 14 to increase its output for a fixed potential across the capacitor 15 causes the input to flip-flop 2 to lead the input to flip-flop 1. As a result, the input to inverting terminal 17 compensates for rising output from differential integrator 21.

It will be seen therefore, that the closed loop which includes capacitor 15, differential integrator 14, voltage-controlled oscillator 10, and flip-flops 1 and 2 results in rapid stabilization of the circuit. Since flip-flops 1 and 2 form a phase comparator to regulate the oscillator output to produce an exact multiple of the input frequency.

Figure 3:
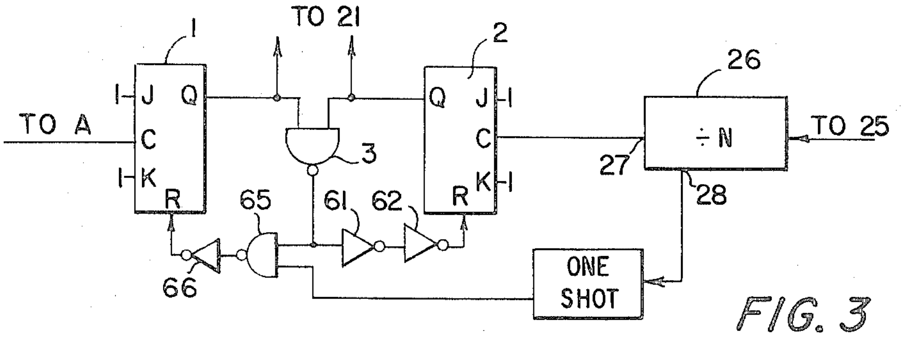
FIG. 3 is a schematic representation of a portion of an alternate embodiment of the present invention.

FIG. 3 shows another form of the present invention which is a partial modification the multiplier of FIG. 1 and only a portion of the circuit is shown. The same reference numerals are used to denote elements corresponding to those in FIG. 1. This embodiment is especially suited for use with a high multiplier and a low input frequency. In this embodiment, further delay means are connected between the NAND-gate 3 and flip-flops 1 and 2. First and second serially connected inverting circuits 61 and 62 are connected between the output of NAND-gate 3 and the reset terminal of flip-flop 2. The output terminal of NAND-gate 3 is also connected to a first input terminal of NAND-gate 65 having its output terminal connected to an inverting circuit 66 which is connected to the reset terminal of flip-flop 1. A "one-shot" multivibrator 68 is connected between the other input terminal of NAND-gate 65 and an output terminal 28 of the "divide-by-N" counter 26 providing a frequency which is twice that at the output terminal 57.

Operation proceeds as in the circuit of FIG. 1. However, at a time corresponding to $t_{1a}$ in FIG. 2*f*, one-shot multivibrator 68 provides a pulse output, and the input applied to the second terminal of the NAND-gate 65 momentarily goes from a "one" level to a "zero" level. It will be remembered that the output of NAND-gate 3 is at a "one" level at this time so that the inputs to NAND-gate 65 which were previously both at the "one" level, are changed. Consequently, the output of NAND-gate 65 momentarily goes to a "one" level, and inverting circuit 66 applies a "zero" to the reset terminal of the flip-flop 1. Flip-flop 1 is thus reset.

One-shot multivibrator 68 affects circuit operation only when the angle $\theta$ is greater than 180°. When the angle $\theta$ is less than 180°, the flip-flops 1 and 2 will reset in the manner of the circuit of FIG. 1. Thus, one-shot multivibrator 68 is actuated only when there is a wide difference between actual and desired output frequency of the voltage-controlled oscillator 10.

By decreasing the duration of the output pulse from the flip-flop 1, the time period during which the capacitor 15 charges is reduced, and, overshooting by the voltage-controlled oscillator of the desired output frequency is prevented. Alternatively, the gain of the voltage-controlled oscillator may be decreased by increasing the value of the integrating capacitor 15.

Other gating methods may be used for resetting the flip-flops 1 and 2. Instead of the arrangement of FIG. 1, the NAND-gate 3 could be provided having its first input connected to one terminal of a set-reset flip-flop and a second NAND-gate could be provided having first and second inputs respectively connected to the $\overline{Q}$ terminals of the flip-flops 1 and 2 and having its output connected to the other input of the set-reset flip-flop. An output of the set-reset flip-flop would be connected to the reset terminals of the flip-flops 1 and 2. Also, to decrease cost the output terminals of the Q output terminals of the flip-flops 1 and 2 could be connected to the base of a switching transistor having its emitter connected to a level of biasing potential and its collector connected to a level with reference potential such as ground and to the reset terminals of the flip-flops 1 and 2.

The present invention thus comprises a frequency multiplier in which a phase and frequency comparator compares the occurrence of input pulses to the production of output pulses in order to determine a voltage level supplied by an input means to a voltage-controlled oscillator producing output pulses. The specification has presented a few of the ways in which a frequency multiplier constructed in accordance with the present may be provided in order to suggest to those skilled in the art the many forms which the present invention may take.

What is claimed as new and desired to be secured by Letters Patent of the United States is:

1. A frequency multiplier comprising, in combination:

a. a first switching means having an input for coupling to a source of input frequency and an output assuming a first state in the absence of an input signal and a second state in response to an input signal;

b. a second switching means having an input and an output, said second switching means assuming a first state in the absence of an input thereto and a second state in response to an input;

c. resetting means for resetting said first and second switching means to their first state when both of said switching means assume their second state;

d. integrating means having first and second inputs respectively connected to said first and second switching means, said integrating means providing an output indicative of the difference of the inputs applied thereto;

e. a voltage-controlled oscillator having an input coupled to the output of said integrating means and having an output for connection to an output frequency utilization means; and f. counting means coupled between the output of said voltage-controlled oscillator and the input of said second switching means for providing an input to said second bistable logic circuit in response to a predetermined number of pulses used by said voltage-controlled oscillator.

2. A frequency multiplier according to claim 1 in which said integrating means comprises a differential integrator having inverting and noninverting inputs.

3. The frequency multiplier according to claim 2 in which said first and second switching means comprise J–K flip-flops.

4. The frequency multiplier according to claim 3 in which potentials having a logic level of 1 are connected to the J and K inputs of said first and second switching means, and the input signal and counting means output are respectively connected to the clock input terminals of said first and second switching means.

5. A frequency multiplier according to claim 4 in which said resetting means comprises a first NAND-gate having first and second inputs coupled to the outputs of said first and second switching means respectively and having an output terminal connected to the resetting inputs of said first and second switching means.

6. A frequency multiplier according to claim 5 in which said resetting means further comprises a second NAND gate and a delaying means connected in series between said first NAND gate and the resetting terminal of said first switching means, a one-shot flip-flop connected between said counting means and a second input terminal of said second NAND gate, and delaying means connected between said first NAND gate and the resetting terminal of said second switching means.

* * * * *